United States Patent
Nemri et al.

(10) Patent No.: US 6,671,374 B1
(45) Date of Patent: Dec. 30, 2003

(54) ADAPTIVE FILTER FOR ECHO CANCELLATION, METHOD FOR OPERATING AN ADAPTIVE FILTER FOR ECHO CANCELLATION, AN ARTICLE OF MANUFACTURE FOR DETERMINING TAP WEIGHTS AND A LENGTH FOR AN ADAPTIVE FILTER FOR ECHO CANCELLATION AND A COMPUTER IMPLEMENTED CONTROL SYSTEM FOR DETERMINING TAP WEIGHTS AND A LENGTH FOR AN ADAPTIVE FILTER FOR ECHO CANCELLATION

(75) Inventors: Omar A. Nemri, San Jose, CA (US); Sandeep Pombra, Santa Clara, CA (US)

(73) Assignee: Globespanvirata, Inc., Red Bank, NJ (US)

( * ) Notice: Subject to any disclaimer, the term of this patent is extended or adjusted under 35 U.S.C. 154(b) by 691 days.

(21) Appl. No.: 09/632,345

(22) Filed: Aug. 3, 2000

(51) Int. Cl.[7] .............................. H04M 1/00; H04B 3/20
(52) U.S. Cl. .................. 379/406.08; 370/290; 370/291; 379/406.01
(58) Field of Search ................... 379/406.01, 406.02, 379/406.03, 406.05, 406.08, 406.09, 406.12, 406.13; 370/286, 289, 290, 291, 292

(56) References Cited

U.S. PATENT DOCUMENTS

| | | | |
|---|---|---|---|
| 4,438,521 A | * 3/1984 | Mattei | ........................ 375/16 |
| 5,289,539 A | 2/1994 | Maruyama | |
| 5,793,864 A | 8/1998 | Ramsden | |
| 5,901,175 A | * 5/1999 | Limberg | ..................... 375/232 |
| 6,028,929 A | 2/2000 | Laberteaux | |
| 6,223,194 B1 | * 4/2001 | Koike | ......................... 708/322 |
| 6,430,287 B1 | * 8/2002 | Rao | ....................... 379/406.08 |
| 6,480,532 B1 | * 11/2002 | Vareljian | ..................... 375/222 |

OTHER PUBLICATIONS

TEC03264 32–Channel ECho Canceller Information Manual, Microelectonics Group, Lucent Technologies (Bell Labs Innovations), Information Manual Aug. 1999.

* cited by examiner

Primary Examiner—Rexford Barnie
(74) Attorney, Agent, or Firm—Thomas, Kayden, Horstemeyer & Risley

(57) ABSTRACT

An adaptive filter for echo cancellation includes a segmented sparse transversal filter having an input, the filter having an adjustable length, adjustable lengths for the segments and adjustable tap weights. The adaptive filter further includes an adaptive tap weight control mechanism providing a tap weight vector including tap weights and a tap weight vector length to the taps of the transversal filter, the adaptive tap weight control mechanism setting the tap weights and the tap weight vector length in response to comparison of estimated truncation error to a target truncation value and in response to a magnitude of integrated cross correlation coefficients between a reference signal and an error signal from the adaptive filter.

30 Claims, 3 Drawing Sheets

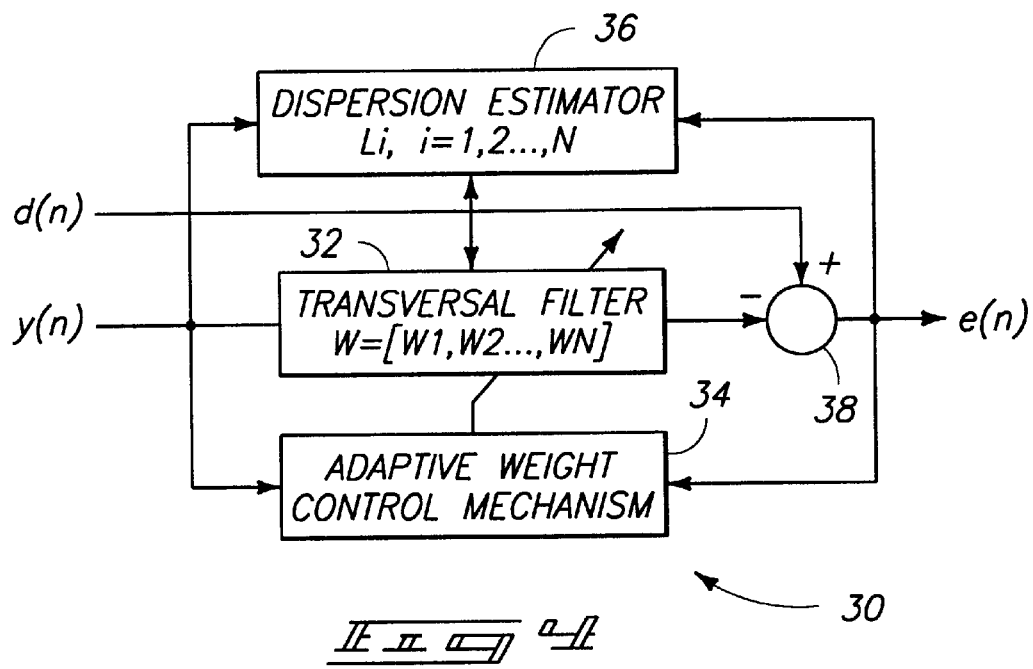
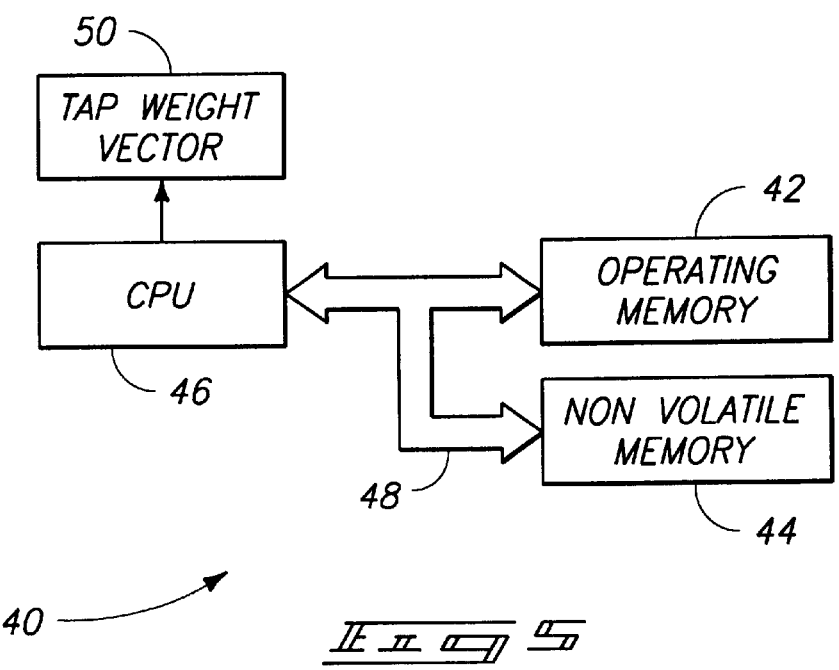

US 6,671,374 B1

ADAPTIVE FILTER FOR ECHO CANCELLATION, METHOD FOR OPERATING AN ADAPTIVE FILTER FOR ECHO CANCELLATION, AN ARTICLE OF MANUFACTURE FOR DETERMINING TAP WEIGHTS AND A LENGTH FOR AN ADAPTIVE FILTER FOR ECHO CANCELLATION AND A COMPUTER IMPLEMENTED CONTROL SYSTEM FOR DETERMINING TAP WEIGHTS AND A LENGTH FOR AN ADAPTIVE FILTER FOR ECHO CANCELLATION

TECHNICAL FIELD

The present invention relates to an adaptive filter for echo cancellation, methods for operating an adaptive filter for echo cancellation, an article of manufacture for determining tap weights and a length for an adaptive filter for echo cancellation and a computer implemented control system for determining tap weights and a length for an adaptive filter for echo cancellation.

BACKGROUND OF THE INVENTION

FIG. 1 is a simplified schematic diagram of a system 10 for coupling communications signals 12 from a first point 14 to a second point 16 via a transmission medium 18 and 18' and vice versa, in accordance with the prior art.

Impedance changes or discontinuities associated with the receiving equipment at the second point 16 can cause a reflected signal or echo 22 to be sent back to the first point 14 when the signal 12 from the first point impinges on the second point.

The reflected signals 22 may be characterized by a magnitude, or attenuation, relative to the communications signals 12, a delay relative to the communications signals 12 and dispersion of reflected signals 22 in time.

It is generally desirable to remove the reflected signals 22 from the transmission medium 18' order to be able to optimize intelligibility for the communications signals at the first point 14. However, in systems such as telephone systems, the signal transmission path through the transmission medium 18, 18' to the second point 16 may change with each call. For example, there may be more than one communications station that is able to respond as the second point 16. As a result, the reflected signals 22 may be different for each call.

Moreover, in modern communications systems, properties of the transmission medium 18, 18' are also a function of time, with the result that the reflected signals 22 change relative to the signal 12 giving rise to the reflected signal 22 with time during a single call. An effective echo cancellation apparatus must be able to alter the echo cancellation in response to changes in the properties of the transmission medium 18 and/or second point 16 during a given data exchange or communications session. An example of a typical telephone system showing digital and analog portions thereof is given in U.S. Pat. No. 5,793,864, entitled "Nonintrusive Measurement Of Echo Power And Echo Path Delay Present On A Transmission Path", issued to Ramsden and which is incorporated herein by reference for its teachings.

Many different schemes have been devised for trying to compensate for these effects in real time. An example is described in U.S. Pat. No. 5,289,539, entitled "Echo Canceller Using Impulse Response Estimating Method", issued to Y. Maruyama and hereby incorporated herein by reference for its teachings on this topic. The method described in U.S. Pat. No. 5,289,539 relies on least mean square (LMS) calculations to set tap weights for a finite impulse response (FIR) filter, based on measured properties of signal reflections. As noted in this patent, these calculations can be impracticable when excessive numbers of arithmetic operations are required, and there are tradeoffs between rapidity of convergence for such calculations and the degree of success in cancellation of the reflected signals 22.

Many of these calculations may be unnecessary, because the reflected signals 22 tend to result from only a few points associated with the second point 16, while the calculations pertain to more of the transmission medium 18 coupled to the second point 16. As a result, many of the computations that are taking place tend to be operations carried out on nullities insofar as the final result is concerned.

Echo cancellation parameters need to be updated frequently enough to reflect the actual signal reflection conditions accurately, requiring repetition of the calculations. Accordingly, reduction in the number of calculations needed for effective echo cancellation is desirable.

What is needed is a method and a corresponding apparatus for allowing reflected signals in signal transmission systems to be canceled without incurring excessive computations.

SUMMARY OF THE INVENTION

In one aspect, the present invention provides an adaptive filter for echo cancellation. The adaptive filter includes a segmented sparse transversal filter having an input, the filter having an adjustable length, adjustable lengths for the segments and adjustable tap weights. The adaptive filter further includes an adaptive tap weight control mechanism providing a tap weight vector including tap weights and a tap weight vector length to the taps of the transversal filter, the adaptive tap weight control mechanism setting the tap weights and the tap weight vector length in response to comparison of integrated cross correlation coefficients between a reference signal and an error signal from the adaptive filter.

In another aspect, the present invention includes a method for operating an adaptive filter for echo cancellation. The method includes generating estimated truncation errors of a tap weight vector for a sparse segmented transversal filter, calculating integrated cross correlation coefficients between a reference signal and an error signal from the sparse segmented transversal filter and comparing the estimated truncation errors to a target truncation error. The method also includes setting a length of the tap weight vector in response to comparing the estimated truncation errors to the target truncation error.

In a further aspect, the present invention includes a method for operating an adaptive filter for echo cancellation. The method includes determining a length for the sparse segmented transversal filter from the estimated reflective properties and adapting a set of tap weights for each segment of the sparse segmented transversal filter from the estimated reflective properties.

In yet another aspect, the present invention includes an article of manufacture comprising a computer usable medium having computer readable code embodied therein to cause a processor to determine a length for the sparse segmented transversal filter from the estimated reflective properties and to adapt a set of tap weights for each segment of the sparse segmented transversal filter from the estimated reflective properties.

In a still further aspect, the present invention includes a computer implemented control system for determining tap weights and a length for an adaptive filter for echo cancellation. The system includes memory configured to store tap weights and processing circuitry. The processing circuitry is configured to determine a length for the sparse segmented transversal filter from the estimated reflective properties and to adapt a set of tap weights for each segment of the sparse segmented transversal filter from the estimated reflective properties.

BRIEF DESCRIPTION OF THE DRAWINGS

Various embodiments of the invention are described below with reference to the following accompanying drawings.

FIG. 4 is a simplified block diagram of a segmented sparse transversal filter together with an adaptive tap weight control mechanism and a dispersion estimator, in accordance with an embodiment of the instant invention.

FIG. 5 is a simplified block diagram of a computer system for implementing the filter of FIG. 4, in accordance with an embodiment of the present invention.

DETAILED DESCRIPTION OF THE PREFERRED EMBODIMENTS

This disclosure of the invention is submitted in furtherance of the constitutional purposes of the U.S. Patent Laws "to promote the Progress of Science and useful Arts" (Article 1, Section 8).

Figure 1:
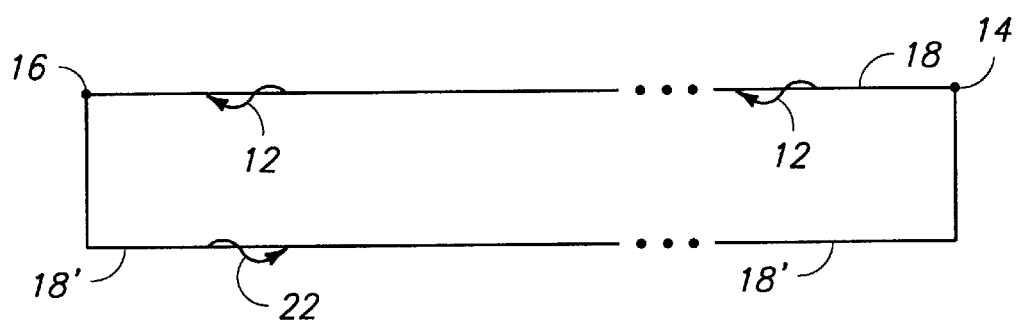
FIG. 1 is a simplified schematic diagram of a system for coupling communications signals from a first point to a second point via a transmission medium, in accordance with the prior art.
Figure 2:
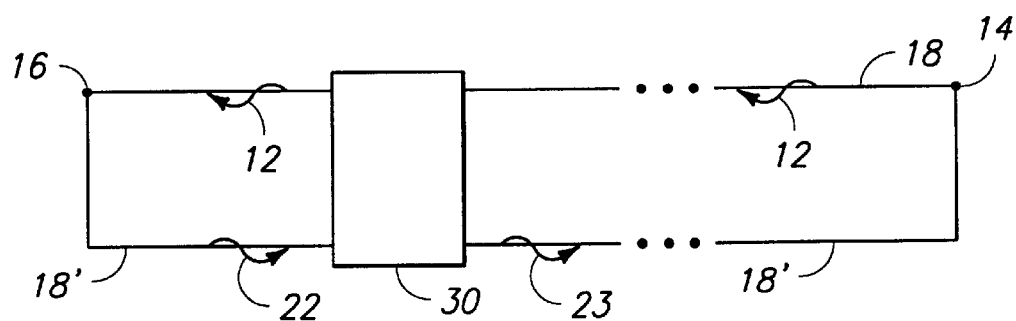
FIG. 2 is a simplified schematic diagram of a system for coupling communications signals from a first point to a second point via a transmission medium, in accordance with an embodiment of the present invention.

FIG. 2 is a simplified schematic diagram of a system 25 for coupling communications signals from the first point 14 to the second point, 16 via the transmission medium 18 and including an echo cancellation system 30, in accordance with an embodiment of the present invention.

The purpose of the echo cancellation system 30 is to remove the echoes 22 and thus to ensure that signals 23 sent from the second point 16 to the first point 14 are free from contributions from the signal 12 that was sent from the first point 14. The echo cancellation system 30 includes a FIR filter that is programmable and that performs echo, cancellation functions.

Figure 3:
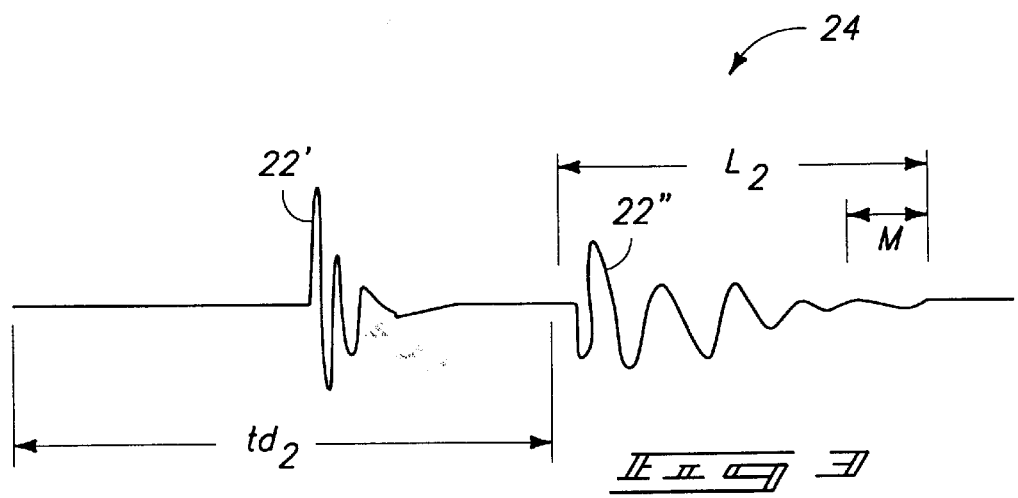
FIG. 3 illustrates an reflected signal response from an example of the transmission medium of FIG. 2.

FIG. 3 illustrates a reflected signal response 24 from an example of the transmission medium 18 of FIG. 2. The reflected signal response 24 includes two echoes or reflections (N=2), labeled 22' and 22". In FIG. 3, a lag index for a second filter segment $L_2$ is denoted $td_2$. The lag index $td_2$ is shown to extend from the origin to a first tap of the $2^{nd}$ filter segment. M denotes the measurement block length for calculating estimated truncation error in the tap weights, as is discussed below in more detail with respect to FIG. 4 and Eqs. 1 and 2-1 through 2-10.

FIG. 4 is a simplified block diagram of an echo cancellation system 30 including a segmented sparse transversal filter 32 together with an adaptive tap weight control mechanism 34, a dispersion estimator 36 and a signal combiner 38, in accordance with an embodiment of the instant invention.

The echo cancellation system 30 of FIG. 4 corresponds to the echo cancellation system 30 of FIG. 2, with the output e(n) providing the signal 23, the input y(n) corresponding to the incoming signal 12 and the reflected signal 22 corresponding to d(n). The goal is to make the signal 23 (corresponding to e(n)) as small as possible, at least during the times when only the point 14 is originating signals 12 (simplex communication).

The dispersion estimator 36 determines the lag indices $td_i$ for the segments $L_i$ of the segmented sparse transversal filter 32 to correspond with the echoes 22 in the reflected signal response 24 of FIG. 3 for the transmission medium 18 of FIG. 2. Dispersion estimation is discussed in detail in U.S. Pat. No. 6,028,929, entitled "Echo Canceller Employing Dual-H Architecture Having Improved Non-Linear Echo Path Detection", issued to Labertaux and which is incorporated herein for its teachings on this topic.

The dispersion estimator 36 also determines a length for each segment $L_i$ of the segmented sparse transversal filter 32 and a length for the segmented sparse transversal filter 32. These properties are then used to generate a tap weight vector W. The tap weight vector W includes N many subsets $W_i$ of filter segment tap weights each corresponding to a respective filter segment $L_i$. The tap weight vector W is applied to the segmented sparse transversal filter 32 by the adaptive tap weight control mechanism 34.

In one embodiment, the segmented sparse transversal filter 32 includes fewer than 1024 taps for a total delay capability of 128 milliseconds, or 125 microseconds per tap. For example, a 22.5 millisecond window within the 128 milliseconds may be chosen for tap weight implementation. It will be appreciated that while the echo cancellation system 30 has been described in terms of voice or data transmission along a transmission medium 18, it is applicable to any sparse signal transmission path with a segmented response, including analog telephony, codex and other signal transmission environments.

The echo cancellation system 30 increases a length of the tap weight vector W and hence of the transversal filter 32 when an estimated truncation error is more than a target truncation error. The echo cancellation system 30 also decreases a length of the tap weight vector W when the estimated truncation error is less than a target truncation error and an error signal is poorly correlated with a reference signal. A metric is used to compare these quantities to determine when and how much to adjust the length of the tap weight vector W in order to maintain effective echo cancellation.

One metric for comparing error signals e(n) to a threshold is F(x, y) as given below, where:

A is a variable

B is a predetermined constant

W is the total filter tap weight vector of length $L=L_1+L_2 \ldots L_N$ $W_i$ is the segment tap weight vector corresponding to segment i of length $L_i$ y(n) is the input or reference signal to the filter d(n) is the desired signal e(n) is the error signal and is equal to d(n)−y(n)

ET is the target truncation error in the impulse response

M is the measurement block length for the target truncation error

τ is the integer gain factor

EW is the energy of the tap weight vector W $ETL_i$ is an estimate of truncation error at the start of the segment tap weight vector $W_i$ $ETR_i$ is an estimate of truncation error at the end of the segment tap weight vector $W_i$ C(k) is the integrated correlation coefficient vector with maximum lag corresponding to the echo canceller's echo path capacity C1 is the average of the integrated correlation coefficients over a block of size M with lag indices corresponding to the delays of the tap weights that enter into the calculation of $ETR_i$ C2 is the average of the integrated correlation coefficients over a block of size M with lag indices corresponding to the delays of the tap weights that enter into the calculation of $ETL_i$ $td_i$ is the lag index corresponding to the delay estimate for the filter segment F(x, y) is an integer function providing a metric for comparing error signals to a threshold. An exemplary implementation of F(x, y), where sgn(x) is a function returning the sign of x, is:

```
F(x, y) = {
    A = sgn(x)
    if (y<B){
        F(x, y) = A;
    }else{
        F(x, y) = max(A, 0)
    }
}
```
Eq. (1)

The first argument x corresponds to a ratio of the estimated truncation error to the total tap weights, as exemplified by Eqs. 2-6 and 2-7 below. The second argument y corresponds to the sum of the absolute values of the integrated correlation coefficients for a block of length M in that segment of the segmented sparse transversal filter 32, as exemplified by Eqs. 2-4 and 2-5 below.

In one embodiment, the metric function F(x, y) is implemented as shown below in Eqs. 2-1 through 2-10. Beginning with iteration k=0, with W and C initialized to 0 and $L_i = L_i 0$, at iteration k:

$$EW(k) = \text{sum}(\text{abs}(W(0:L-1)))$$ Eq. (2-1)

$$ETL_i(k) = \text{sum}(\text{abs}(W(0:M-1)))$$ Eq. (2-2)

$$ETR_i(k) = \text{sum}(\text{abs}(W(L_i-1:L_i-M)))$$ Eq. (2-3)

$$C1(k) = \text{sum}(\text{abs}(C(k, td_i+L_i-M:td_i+L_i-1)))$$ Eq. (2-4)

$$C2(k) = \text{sum}(\text{abs}(C(k, td_i:td_i+M-1)))$$ Eq. (2-5)

$$X1(k) = (ETR_i(k)/EW(k)) - ET$$ Eq. (2-6)

$$X2(k) = (ETL_i(k)/EW(k)) - ET$$ Eq. (2-7)

$$\Delta L1(k) = \tau * F(X1(k), C1(k))$$ Eq. (2-8)

$$\Delta L2(k) = \tau * F(X2(k), C2(k))$$ Eq. (2-9)

$$L_i(k+1) = L_i(k) + \Delta L1(k) + \Delta L2(k)$$ Eq. (2-10)

It will be appreciated that other functions may be employed for the metric F(x, y). As the echo cancellation system 30 converges, the error signal e(n) decreases (and thus $ETL_i(k)$ and $ETR_i(k)$ decrease), and ΔL1(k) and ΔL2(k) decrease to zero or near zero. When characteristics of the transmission medium 18 of FIG. 2 change, the error signal e(n) increases, ΔL1(k) and ΔL2(k) change and the tap weights, segment lengths and filter length are adjusted until the echo cancellation system 30 reconverges, reducing effects of the reflected signals 22.

FIG. 5 is a simplified block diagram of a computer system 40 for implementing the echo cancellation system 30 of FIG. 4, in accordance with an embodiment of the present invention. The computer system 40 includes operating memory 42, nonvolatile memory 44 and a processor or CPU 46, coupled together by a bus 48. The computer system 40 outputs a tap weight vector 50 in response to data and/or signals from the echo cancellation system 30 of FIG. 4. The operating memory 42 is a rapid access read-write memory such RAM, SRAM or DRAM and is configured to store data in performing calculations. The nonvolatile memory 44 may include ROM, WORM memory, PROM, floppy disk, hard drive, compact disk, tape, etc. having computer readable code embodied therein configured to cause the processor 46 to implement the algorithm of Eqs. 2-1 through 2-10, or a similar algorithm, to facilitate operation of the echo cancellation system 30.

Figure 6:
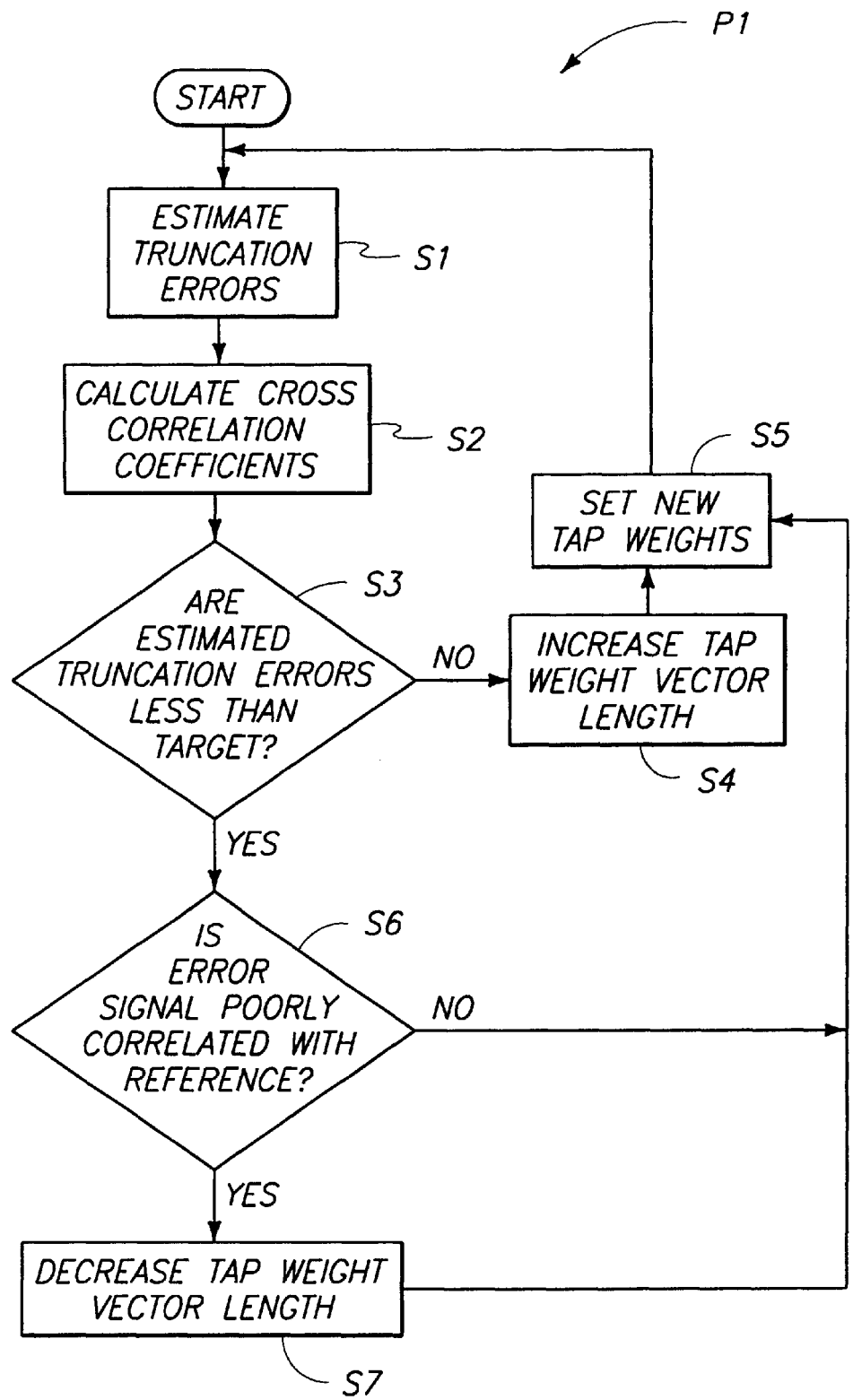
FIG. 6 is a simplified flow chart of a process for operating an adaptive filter for echo cancellation, in accordance with an embodiment of the present invention.

FIG. 6 is a simplified flow chart of a process P1 for operating an adaptive filter for echo cancellation, in accordance with an embodiment of the present invention. The process P1 begins in a step S1.

In the step S1, truncation errors of a tap weight vector for a sparse segmented transversal filter are estimated.

In a step S2, cross correlation coefficients between a reference signal and an error signal from the sparse segmented transversal filter are calculated.

In a query task S3, the estimated truncation errors are compared to a target truncation error. When the estimated truncation errors are not smaller than the target truncation error, control passes to a step S4.

In the step S4, a length of the tap weight vector is increased. Control then passes to a step S5.

In the step S5, new tap weights are set for the adaptive filter. The process P1 then restarts with the step S1.

When the query task S3 determines that the estimated truncation errors are less than the target truncation error, control passes to a query task S6.

The query task S6 determines when an error signal is poorly correlated with a reference signal. When the error signal is not poorly correlated with the reference signal, the adaptive filter has converged, no changes are made to the tap weights and control passes back to step S5. When the query task S6 determines that the error signal is poorly correlated with the reference signal, control passes to a step S7.

In the step S7, the length of the tap weight vector is decreased. Control then passes to the step S5 and proceeds as described above.

A target attenuation for echo reduction may be set at any appropriate level. For example, it may be desired to reduce echo amplitude by 40 dB or 50 dB. A suitable level that does not require excessive computation or filter tap weight adjustment is chosen.

By reducing computations to a critical length and simultaneously adjusting lengths of respective filter segments and thus the overall length of the filter, a steepest gradient (LMS) technique for tap weight vector estimation is able to provide rapid convergence. As a result, improved echo cancellation is provided.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. An adaptive filter for echo cancellation comprising:
   a segmented sparse transversal filter having an input, the filter having an adjustable length, adjustable lengths for the segments and adjustable tap weights; and
   an adaptive tap weight control mechanism providing a tap weight vector including tap weights and a tap weight vector length to the taps of the transversal filter, the adaptive tap weight control mechanism setting the tap weights and the tap weight vector length in response to comparison of integrated cross correlation coefficients between a reference signal and an error signal from the adaptive filter.

2. The adaptive filter of claim 1, wherein the length of the tap weight vector is increased when an estimated truncation error is larger than a target truncation error.

3. The adaptive filter of claim 1, wherein the length of the tap weight vector is decreased when an estimated truncation error is less than a target truncation error.

4. The adaptive filter of claim 1, wherein the length of the tap weight vector is decreased when an estimated truncation error is less than a target truncation error and an error signal is poorly correlated with a reference signal.

5. The adaptive filter of claim 1, wherein the tap weight vector includes a plurality of tap weight segment vectors each having a respective length and the adaptive tap weight control mechanism sets tap weights and lengths for the tap weight segment vectors in response to a magnitude of integrated cross correlation coefficients between a reference signal and an error signal from the adaptive filter.

6. The adaptive filter of claim 1, wherein the adaptive tap weight control mechanism is configured to:
   generate estimated truncation errors of the tap weight vector;
   calculate integrated cross correlation coefficients between a reference signal and an error signal from the sparse segmented transversal filter;
   compare the estimated truncation errors to a target truncation error; and
   increase a length of the tap weight vector when the estimated truncation errors are larger than the target truncation error.

7. The adaptive filter of claim 1, wherein the adaptive tap weight control mechanism is configured to:
   generate estimated truncation errors of the tap weight vector;
   calculate integrated cross correlation coefficients between a reference signal and an error signal from the sparse segmented transversal filter;
   compare the estimated truncation errors to a target truncation error; and
   decrease a length of the tap weight vector when the estimated truncation errors are smaller than the target truncation error and the error signal is poorly correlated with the reference signal.

8. The adaptive filter of claim 7, wherein the adaptive tap weight control mechanism is configured to increase a length of the tap weight vector when the estimated truncation errors are larger than the target truncation error.

9. A method for operating an adaptive sparse segmented transversal filter for echo cancellation, comprising:
   generating estimated truncation errors of a tap weight vector for the sparse segmented transversal filter;
   calculating integrated cross correlation coefficients between a reference signal and an error signal from the sparse segmented transversal filter;
   comparing the estimated truncation errors to a target truncation error;
   comparing the integrated cross correlation coefficients to a predetermined threshold; and
   setting a length of the tap weight vector in response to comparing the estimated truncation errors to the target truncation error and comparing the integrated correlation coefficients to a predetermined threshold.

10. The method of claim 9, wherein setting comprises increasing the length of the tap weight vector when the estimated truncation errors are larger than the target truncation error.

11. The method of claim 9, wherein setting comprises decreasing the length of the tap weight vector when the estimated truncation errors are smaller than the target truncation error and the error signal is poorly correlated with the reference signal.

12. The method of claim 9, wherein setting comprises:
   increasing the length of the tap weight vector when the estimated truncation errors are larger than the target truncation error; and
   decreasing the length of the tap weight vector when the estimated truncation errors are smaller than the target truncation error and the error signal is poorly correlated with the reference signal.

13. The method of claim 9, wherein setting comprises adapting a respective set of tap weights for each segment of the sparse segmented transversal filter based on comparing the estimated truncation errors to the target truncation error and correlating the error signal with the reference signal.

14. A method for operating an adaptive sparse segmented transversal filter for echo cancellation, comprising:
   comparing estimated truncation errors to a target truncation error;
   determining a respective length for each segment of the sparse segmented transversal filter in response to comparing;
   determining the length for the sparse segmented transversal filter in response to comparing; and
   adapting a respective set of tap weights for each segment of the sparse segmented transversal filter in response to comparing.

15. The method of claim 14, further comprising:
   correlating an error signal with a reference signal; and wherein
   determining respective lengths for each segment of the sparse segmented transversal filter comprises determining lengths for each segment of the sparse segmented transversal filter in response to comparing and correlating;
   determining a length for the sparse segmented transversal filter comprises determining the length for the sparse segmented transversal filter in response to comparing and correlating; and adapting a set of segment tap weights comprises adapting a set of tap weights for the segmented sparse transversal filter in response to comparing and correlating.

16. The method of claim 14, wherein determining a length comprises increasing a length of the sparse segmented transversal filter in response to comparing determining that the estimated truncation error exceeds the target truncation error.

17. An article of manufacture for determining tap weights and a length for an adaptive filter for echo cancellation, the article of manufacture comprising a computer usable medium having computer readable code embodied therein to cause a processor to:

compare estimated truncation errors to a target truncation error;

determine respective lengths for each segment of a sparse segmented transversal filter in response to comparing;

determine a length for the sparse segmented transversal filter in response to comparing; and adapt a respective set of tap weights for each segment of the sparse segmented transversal filter in response to comparing.

18. The article of manufacture of claim 17, further comprising computer readable code configured to cause the processor to correlate an error signal with a reference signal, wherein the computer readable code configured to cause a processor to determine respective lengths for each segment of a sparse segmented transversal filter comprises computer readable code configured to cause the processor to determine a respective length for each segment in response to correlating the error signal with the reference signal.

19. The article of manufacture of claim 17, wherein the computer readable code configured to cause a processor to determine a length for the sparse segmented transversal comprises computer; readable code configured to cause the processor to increase a length for the sparse segmented transversal filter in response to determining that the estimated truncation error exceeds the target.

20. The article of manufacture of claim 18, wherein the computer readable code configured to cause a processor to adapt a set of tap weights comprises computer readable code configured to cause the processor to adapt a set of tap weights for the segmented sparse transversal filter in response to correlating and comparing.

21. The article of manufacture of claim 17, wherein the computer readable code configured to cause a processor to determine lengths for each segment of a sparse segmented transversal properties and to determine a length for the sparse segmented transversal filter comprises computer readable code configured to cause the processor to:

generate estimated truncation errors of a tap weight vector for the sparse segmented transversal filter;

calculate integrated cross correlation coefficients between a reference signal and an error signal from the sparse segmented transversal filter;

compare the estimated truncation errors to a target truncation error; and set a length of the tap weight vector in response to comparing the estimated truncation errors to a target truncation error.

22. The article of manufacture of claim 21, wherein the computer readable code configured to cause a processor to set a length of the tap weight vector comprises computer readable code configured to cause the processor to increase the length of the tap weight vector when the estimated truncation errors are larger than the target truncation error.

23. The article of manufacture of claim 21, wherein the computer readable code configured to cause a processor to set a length of the tap weight vector comprises computer readable code configured to cause the processor to decrease the length of the tap weight vector when the estimated truncation errors are smaller than the target truncation error and the error signal is poorly correlated with the reference signal.

24. The article of manufacture of claim 21, wherein the computer readable code configured to cause a processor to set a length of the tap weight vector comprises computer readable code configured to cause the processor to:

increase the length of the tap weight vector when the estimated truncation errors are larger than the target truncation error; and decrease the length of the tap weight vector when the estimated truncation errors are smaller than the target truncation error and the error signal is poorly correlated with the reference signal.

25. A computer implemented control system for determining a tap weight vector and a length for an adaptive sparse segmented transversal filter for echo cancellation, the system comprising:

memory configured to store the tap weight vector for the adaptive filter; and processing circuitry configured to:

generate estimated truncation errors of a tap weight vector for the sparse segmented transversal filter;

calculate integrated cross correlation coefficients between a reference signal and an error signal from the sparse segmented transversal filter;

compare the estimated truncation errors to a target truncation error; and set a length of the tap weight vector in response to comparing the estimated truncation errors to a target truncation error.

26. The control system of claim 25, wherein the processing circuitry configured to determine respective lengths for each segment of a sparse segmented transversal filter further comprises processing circuitry configured to increase respective lengths for each segment of the sparse segmented transversal filter when estimated truncation errors exceed the target truncation threshold.

27. The control system of claim 25, wherein the processing circuitry configured to determine a length for the sparse segmented transversal filter comprises processing circuitry configured to cause the processor to decrease the length for the sparse segmented transversal filter when estimated truncation errors are less than the target truncation threshold and an error signal is poorly correlated with a reference signal.

28. The control system of claim 25, wherein the processing circuitry configured to determine respective lengths for each segment of a sparse segmented transversal filter and to determine a length for the sparse segmented transversal filter comprises processing circuitry configured to:

generate estimated truncation errors of the tap weight vector for the sparse segmented transversal filter;

calculate integrated cross correlation coefficients between a reference signal and an error signal from the sparse segmented transversal filter;

compare the estimated truncation errors to a target truncation error;

determine when the integrated cross correlation coefficients exceed a predetermined threshold; and set the length of the tap weight vector in response to the comparison and the determination.

29. The control system of claim 25, wherein the processing circuitry configured to set the length of the tap weight vector comprises processing circuitry configured to increase the length of the tap weight vector when the estimated truncation errors are larger than the target truncation error.

30. The control system of claim 25, wherein the processing circuitry configured to set the length of the tap weight vector comprises processing circuitry configured to:

increase the length of the tap weight vector when the estimated truncation errors are larger than the target truncation error; and decrease the length of the tap weight vector when the estimated truncation errors are smaller than the target truncation error and the error signal is poorly correlated with the reference signal.

* * * * *